United States Patent
Safranski (10) Patent No.: US 9,188,426 B2
(45) Date of Patent: Nov. 17, 2015

(54) NON-CONTACT VISUAL MEASUREMENT DEVICE

(71) Applicant: Bradley Allen Safranski, Glen Burnie, MD (US)

(72) Inventor: Bradley Allen Safranski, Glen Burnie, MD (US)

( * ) Notice: Subject to any disclaimer, the term of this patent is extended or adjusted under 35 U.S.C. 154(b) by 27 days.

(21) Appl. No.: 14/260,277

(22) Filed: Apr. 23, 2014

(65) Prior Publication Data

US 2014/0313522 A1   Oct. 23, 2014

Related U.S. Application Data

(60) Provisional application No. 61/814,895, filed on Apr. 23, 2013.

(51) Int. Cl.
| | |
|---|---|
| *G01B 11/14* | (2006.01) |
| *G01B 11/02* | (2006.01) |
| *G01B 3/04* | (2006.01) |
| *G01B 3/10* | (2006.01) |

(52) U.S. Cl.
CPC ...... *G01B 11/02* (2013.01); *G01B 3/04* (2013.01); *G01B 2003/1092* (2013.01)

(58) Field of Classification Search
USPC ............ 356/614, 141.1, 152.1; 345/156, 157, 345/169; 250/330
See application file for complete search history.

(56) References Cited

U.S. PATENT DOCUMENTS

| | | | | |
|---|---|---|---|---|
| 5,914,783 | A  * | 6/1999 | Barrus ........................ | 356/614 |
| 6,043,876 | A  * | 3/2000 | Holliday et al. ........... | 356/237.1 |
| 6,323,839 | B1 * | 11/2001 | Fukuda et al. ............... | 345/157 |
| 8,723,803 | B2 * | 5/2014 | Banning ...................... | 345/169 |
| 2002/0027652 | A1 * | 3/2002 | Paromtchik et al. ........ | 356/141.1 |
| 2004/0001197 | A1 * | 1/2004 | Ko et al. ..................... | 356/152.1 |
| 2004/0041786 | A1 * | 3/2004 | Inoue et al. .................. | 345/156 |
| 2009/0250611 | A1 * | 10/2009 | Strandemar .................. | 250/330 |
| 2011/0043537 | A1 * | 2/2011 | Dellon et al. ................ | 345/647 |
| 2013/0263326 | A1 * | 10/2013 | Heath et al. ................. | 800/279 |
| 2014/0184496 | A1 * | 7/2014 | Gribetz et al. ............... | 345/156 |

* cited by examiner

*Primary Examiner* — Sang Nguyen (57) ABSTRACT

A positional measuring device has a reference laser pointer and at least one measurement laser pointer. These laser pointers are positioned at a first end and a second end of a variable-length defining mechanism, a common example being a tape measure. The lasers are oriented in a direction which is perpendicular to the measurement axis of a user-specified length of the variable-length defining mechanism. The emission axis of each laser is thus parallel with each other. The lasers project onto a remote object. The laser pointers provide visual reference points that help a user ensure they are correctly measuring dimensions of an object. The distance between the laser pointers can easily be read via the variable-length defining mechanism. Because the lasers need to be parallel to each other and perpendicular to the user-specified length, a dual-axis liquid level is provided to ensure proper orientation of the positional measuring device.

19 Claims, 4 Drawing Sheets

NON-CONTACT VISUAL MEASUREMENT DEVICE

The current application claims a priority to the U.S. Provisional Patent application Ser. No. 61/814,895 filed on Apr. 23, 2013.

FIELD OF THE INVENTION

The present invention relates generally to a method and apparatus for a type of measuring device. More specifically, the present invention is a method and apparatus that allows for an easy and quick measurement to be taken without contacting the object or surface intended to be measured and removes the risk of thereby physically contacting and disturbing the object or surface.

BACKGROUND OF THE INVENTION

Currently, on the market there are many different types of measuring devices. The available measuring devices provide a number of different constructions and accessories that may be desirable to various customer bases. The present invention concerns itself with a subset of measuring devices, those utilizing lasers as a measurement tool. However, currently available laser measuring devices are limited to measuring distance from the laser source to a point; as a result, said laser points are no better equipped to remotely measure the dimensions of objects than traditional devices such as tape measures. Though traditional measuring devices are capable of measuring dimensions of an object, doing so requires a person using the measuring device to be proximal to the object being measured. Furthermore, to obtain the most accurate measurements the user must place part of the measuring device against the object; while direct contact is fine in many situations, there are other situations in which it is undesirable to directly contact the object being measured. Potentially, there may be situations where direct contact is impossible or greatly hampered due to physical or other obstructions. In such situations traditional measuring devices would be of little use.

The shortcomings of current measuring devices results in a need on the market for the unique functionality of the present invention. It is therefore an object of the present invention to introduce a new method and apparatus that allows for an easy and quick measurement to be taken without contacting the object or surface intended to be measured and removes the risk of thereby physically contacting and disturbing the object or surface.

DETAILED DESCRIPTION OF THE INVENTION

All illustrations of the drawings are for the purpose of describing selected versions of the present invention and are not intended to limit the scope of the present invention.

The present invention is a non-contact visual measurement device that eliminates the risk of disturbing the measured object or surface. The present invention is best used in applications that do not require a high degree of precision. The present invention mainly comprises a positional measuring device 1, a reference laser pointer 5, and an at least one measurement laser pointer 6. The positional measuring device 1 is used to physically measure length, width, and/or height of an object or surface. The positional measuring device 1 can be, but is not limited to, a ruler and a tape measure. Thus, the positional measuring device 1 needs to comprise a variable-length defining mechanism 2, which allows a user to measure a specified length. The variable-length defining mechanism 2 can be, but is not limited to, a slidable indicator attached to the ruler and an uncoiled portion for the tape measure. The variable-length defining mechanism 2 comprises a first end 3 and a second end 4, which are adjustably positioned opposite to each other along the user-specified length 100. For example, the first end 3 of the ruler would be the zero mark, and the second end 4 of the ruler would be the slidable indicator. Another example is that the first end 3 and the second end 4 are opposite ends of the uncoiled portion of the tape measure.

The reference laser pointer 5 and the measurement laser pointer 6 allows the present invention to emit lasers from the first end 3 and the second end 4 onto the measured object or surface so that the user can view the laser upon the measured object or surface. Thus, the reference laser pointer 5 is mounted onto the first end 3, and the measurement laser pointer 6 is mounted onto the second end 4. When an object or surface is being measured by the present invention, the reference laser pointer 5 is used to indicate the zero position, and the measurement laser pointer 6 is used to indicate the offset position. The configuration of the reference laser pointer 5 and the measurement laser pointer 6 allow the user to make more accurate length measurements with the present invention.

Figure 1:
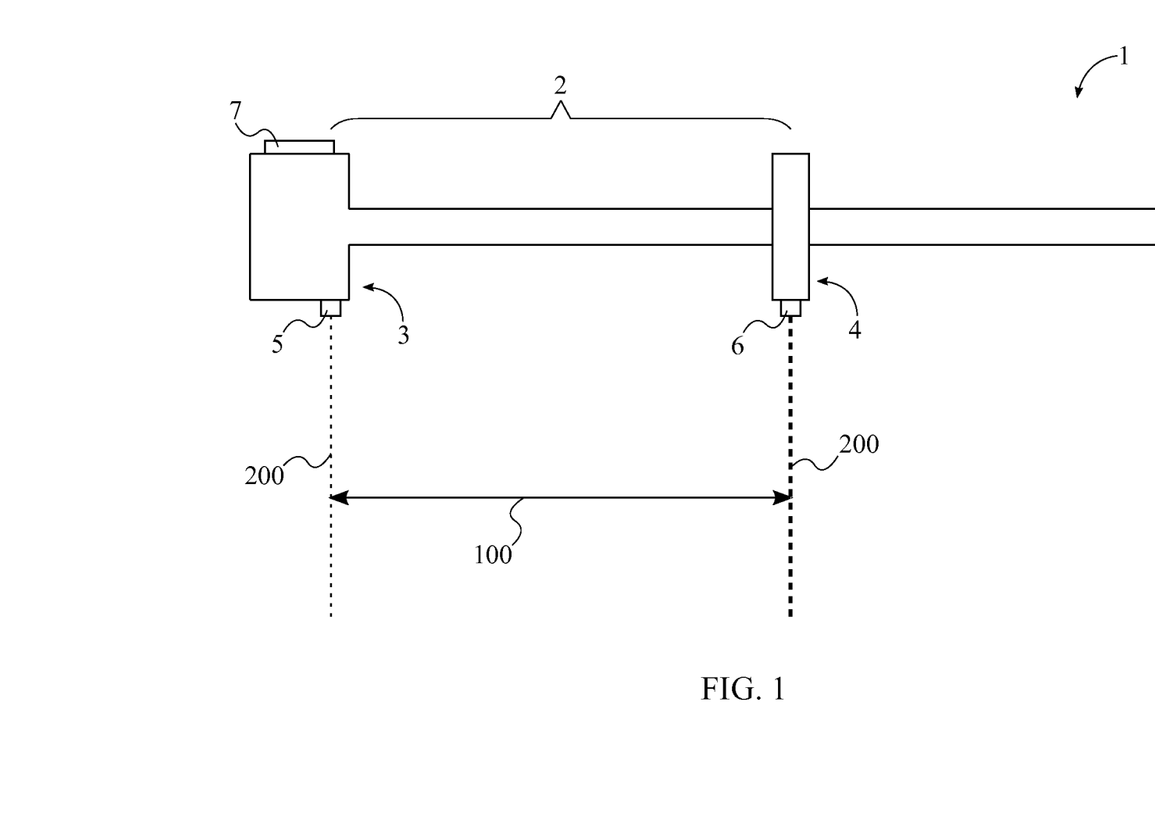
FIG. 1 is a block diagram for the slidable ruler embodiment of the present invention.
Figure 2:
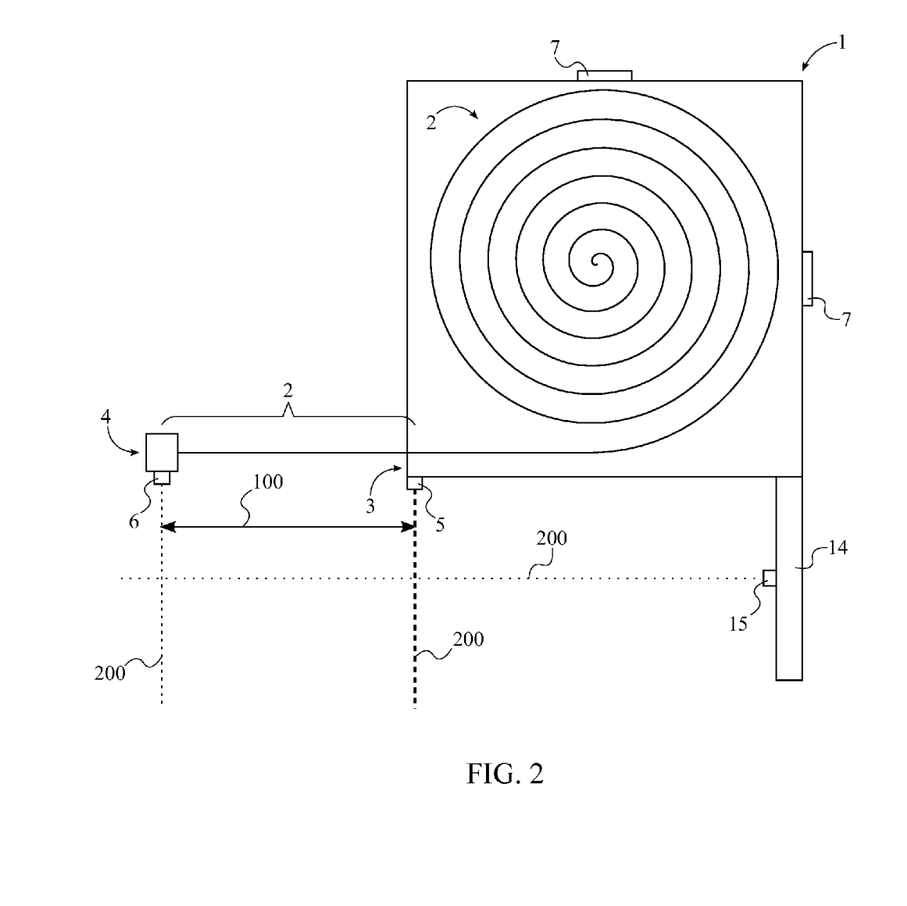
FIG. 2 is a block diagram for the tape measure embodiment of the present invention.
Figure 3:
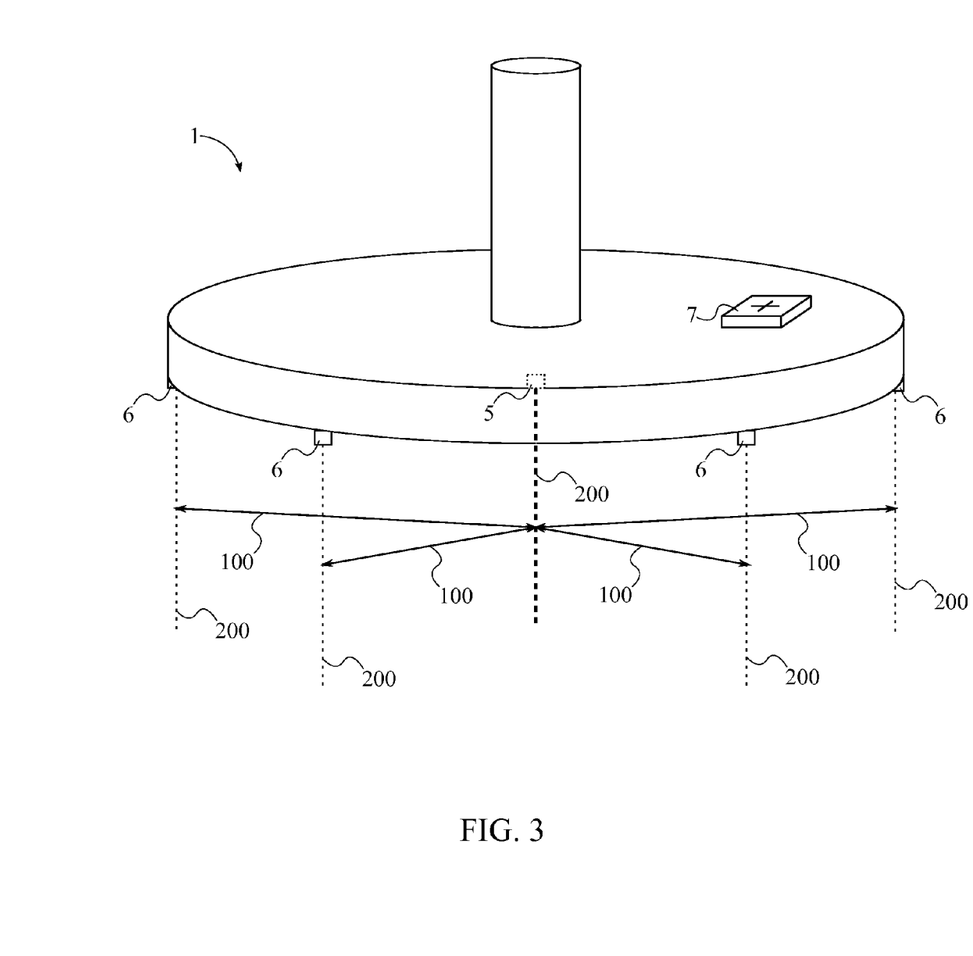
FIG. 3 is a perspective view for the radial measurement embodiment of the present invention.

An emission axis 200 for a laser pointer defines the trajectory of the laser being emitted from the laser pointer. The reference laser pointer 5 needs to be mounted to the first end 3 in such a way that the emission axis 200 for the reference laser pointer 5 is positioned perpendicular to the user-specified length 100. Likewise, the measurement laser pointer 6 needs to be mounted to the second end 4 in such a way that the emission axis 200 for the reference laser pointer 5 is perpendicular to the user specified length. If these emission axes 200 were not perpendicular to the user-specified length 100, then the lasers viewed upon the measured object or surface would indicate a different length than the length shown on the positional measuring device 1. In addition, the reference laser pointer 5 and the measurement laser pointer 6 need to be mounted to their respective end in such a way that their emission axes 200 are parallel to each other. If there emission axes 200 were not parallel to each other, then, again, the lasers viewed upon the measured object or surface would indicate a different length than the length shown on the positional measuring device 1. Both the reference laser pointer 5 and the measurement laser pointer 6 also need to be mounted to their respective end in such a way that their emission axes 200 are oriented in the same direction. If these emission axes 200 were oriented in opposite directions, then the laser could not be simultaneously viewed upon the measured object or surface. In one embodiment, the present invention contains a plurality of measurement laser pointers 6 that are radially positioned around the reference laser pointer 5. In this embodiment, the present invention is used to measure if an object is outside of the radius of a user-specified reference point.

In some embodiments, the present invention further uses at least one dual-axis liquid level 7 in order to assist the user in properly orienting the present invention and in taking accurate measurements. The dual-axis liquid level 7 has a buoyant portion that indicates a leveled orientation for the present invention. The dual-axis liquid level 7 is externally mounted onto the positional measuring device 1 so that the user can view the dual-axis liquid level 7 while reorienting the present invention. In order to describe the configuration of the dual-axis liquid level 7, a plane is defined by the emission axes 200 for the reference laser pointer 5 and the measurement laser pointer 6. The dual-axis liquid level 7 is positioned perpendicular to that plane so that the emission axes 200 of the reference laser pointer 5 and the measurement laser pointer 6 are directed towards the measured object or surface in a manner that allows the user to obtain an accurately oriented measurement. However, if the present invention had only one dual-axis liquid level 7, then the emission axes 200 of the reference laser pointer 5 and the measurement laser pointer 6 could only be properly oriented in the horizontal or vertical direction. If the present invention has two dual-axis liquid levels 7 that are perpendicularly oriented to each other, then the emission axes 200 of the reference laser pointer 5 and the measurement laser pointer 6 could be properly oriented in both the horizontal and vertical direction. In other embodiment, the present invention can include mechanical tilt switches or a digital accelerometer to detect the orientation of the present invention and turn the laser pointers off if they might shine in an undesired direction.

In some embodiments, the present invention further uses a pivot rod 14 and an alignment laser 15 pointer in order to aim the orientation of the present invention towards a particular target. The pivot rod 14 is positioned perpendicular to the user-specified length 100 and is positioned parallel to the emission axes 200 of the reference laser pointer 5 and the measurement laser pointer 6. Thus, the alignment laser 15 point can be perpendicularly mounted to the pivot rod 14 so that the emission axis 200 of the alignment laser 15 point intersects the emission axes 200 of the reference laser pointer 5 and the measurement laser pointer 6. The geometry for these emission axes 200 allows a user to aim the present invention towards the particular target.

Figure 4:
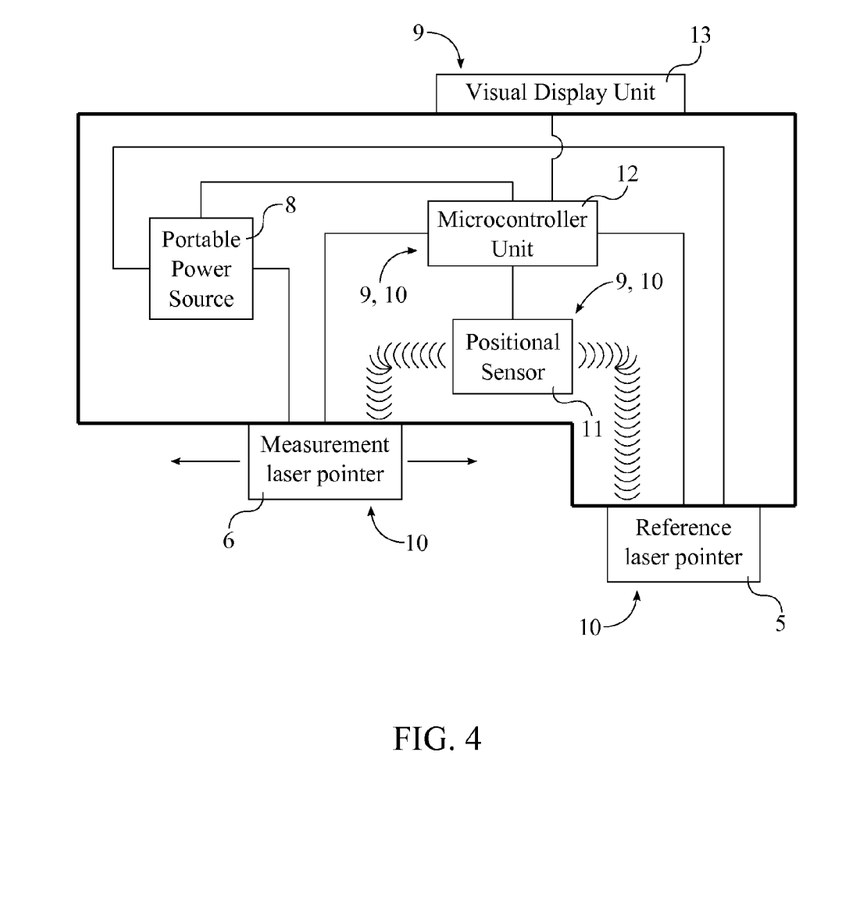
FIG. 4 is a schematic for the electronic components of the present invention.

The present invention contains ancillary electrical components that improve its functionality. One such electrical component is at least one portable power source 8, which is used to electrically power the reference laser pointer 5 and the measurement laser pointer 6. Thus, the portable power source 8 is electrically connected to the reference laser pointer 5 and the measurement laser pointer 6. The portable power source 8 is also housed within the position measuring device in order to protect the portable power source 8 from external damage. In some embodiments, the reference laser pointer 5 and the measurement laser pointer 6 will each have their own portable power sources 8 in order to simplify the electrical configuration of the present invention.

Another such electrical component is the measurement display system 9, which can automatically read the user-specified length 100 from the variable-length defining mechanism 2 and can enlarge and digitally display the user-specified length 100. The measurement display system 9 comprises at least one positional sensor 11, a microcontroller unit 12, and a visual display unit 13. The positional sensor 11 is operatively coupled between the first end 3 and the second end 4, which allows the positional sensor 11 to continuously read the current length between the first end 3 and the second end 4. The microcontroller unit 12 is used to manage the digital functions of the present invention. The positional sensor 11 is electronically connected to the microcontroller unit 12 so that the present invention receives and processes the readings from the positional sensor 11. In addition, the microcontroller unit 12 is housed within the positional measuring device 1. Once the microcontroller unit 12 processes the reading from the positional sensor 11 into a numerical value for the user-specified length 100, the microcontroller unit 12 will prompt the visual display unit 13 to show that numerical value so that the user can see the numerical value for the user-specified length 100. Consequently, the microcontroller unit 12 needs to be electronically connected to the visual display unit 13. Furthermore, the visual display unit 13 is externally mounted to the positional measurement device.

Another such electrical component is the automatic laser activation system 10, which automatically activates the reference laser pointer 5 and the measurement laser pointer 6 if the user-specified length 100 is greater than zero. Similar to the measurement display system 9, the automatic laser activation system 10 will utilize the positional sensor 11 and the microcontroller unit 12. Once the microcontroller unit 12 processes a reading from the positional sensor 11 that states the user-specified length 100 is zero (or that states the first end 3 and the second end 4 are on top of each other), then the microcontroller unit 12 will deactivate the reference laser pointer 5 and the measurement laser pointer 6. Thus, the microcontroller unit 12 needs to be electronically connected to both the reference laser pointer 5 and the measurement laser pointer 6.

The following is description of detailed embodiments for the present invention. These descriptions include the components and how those components work together for each embodiment:

First Embodiment

In the first embodiment of the present invention, the components are: a battery pack containing batteries to power the lasers, controlled by an on/off switch; a ruler with sliding plastic length indicator captivated in ruler track; two laser diodes; two thick copper wires or thin copper rods; an insulated copper wire; two small captivated spring pistons; small angled or curved plastic arms; two small rounded copper contacts; and a small dual-axis liquid level. How the components function together is described in the following:

Batteries are inserted in battery pack

Ruler with sliding indicator is attached to battery pack with screw and glue, forming handle One laser diode is glued to the battery pack such that the laser shines directly down at the measured surface at the ruler's 0 point Thick copper wire or thin copper rods are glued to the underside of the ruler. These serve as power and ground leads for the sliding laser diode.

Second laser diode is glued to sliding length indicator on ruler

Plastic arms are glued to sliding length indicator on ruler in order to hold spring pistons.

Spring pistons are glued to plastic arms

Copper contacts are glued to spring pistons such that they each make contact with one of the copper rods. Spring pistons keep the copper contacts under a small amount of pressure with the copper rods in order to maintain an electrical connection as the ruler slides.

Wire leads connected to laser diode on sliding length indicator are soldered to copper contacts on spring pistons and attached along plastic arms Battery pack output wires are soldered to copper rods and to reference point laser power wires Dual-axis liquid level is fixed to end of sliding ruler Second Embodiment In the second embodiment of the present invention, the components are: a battery pack containing batteries to power the lasers, controlled by an on/off switch; two laser diodes; two rigid extending nesting rods with a rubberized outer shell and a conducting inner shell, the rigid extending rods being marked for length; an insulated copper wire; a small dual-axis liquid level; a rectangular plastic end cap, and an optional measuring tape. How the components function together is described in the following:

Batteries are inserted in battery pack

Rigid extending nesting rods are screwed into inside of battery pack parallel to each other. These will serve as an extending measuring apparatus.

One laser diode is glued to the battery pack such that the laser shines directly down at the measured surface at the nesting rods' 0 (reference) point.

Reference laser diode power and ground leads are soldered to battery pack power and ground leads Rectangular plastic end cap is attached to end of nesting rods to stabilize device and create mounting platform for measuring laser diode.

Battery power and ground wires are soldered to electrical contacts of extending rods to provide power and ground to the measuring laser diode.

Second laser diode is glued to plastic end cap to serve as measuring point from reference.

Both lasers diodes' contact wires are soldered to contacts at ends of extending nesting rods to power lasers.

Dual-axis liquid level is fixed to battery pack or to plastic end cap.

(Optional) Measuring tape is affixed to handle and tape end is affixed to plastic end cap such that measuring tape extends as nesting rods are extended. This is another way to show the length between the reference laser point and the measuring laser point.

Third Embodiment

In the third embodiment of the present invention, the components are: a tape measure; a plurality of mechanical reed switches; coin cell batteries with PCB mountable clips; cards made from a plastic material; two laser diodes with corresponding plastic mounting clips; insulated copper wire; PCB standoffs and similar miscellaneous hardware; two small perforated circuit boards; zip ties; a small liquid bubble level; and a plastic clip with an adhesive backing. How the components function together is described in the following:

Battery clips are each soldered to a small rectangular piece of prototype PCB with power and ground lead wires One battery PCB assembly is mounted on the side of the tape measure using glue and one or more standoffs with screws The small liquid bubble level is glued to the tape measure above the side-mounted battery PCB Coin cell batteries are inserted in battery clips Each of two rectangular pieces of plastic card material has three holes drilled in it, sized to fit the leads of the mechanical reed switches (one with holes at the top of the rectangle running horizontally, the other with the holes in the middle of the rectangle running vertically)

The mechanical reed switches are glued in place with their terminals through the holes. These may be reinforced using zip ties.

The plastic rectangle with the horizontal holes is attached below the tape measure entrance port using small screws At the bottom of the attached plastic rectangle, a hole is drilled and one or more standoffs are attached with a screw. The total length of the standoff should be such that a laser diode mounted on the end of it will be at the same distance from the tape measure entrance port as the laser mounted on the end of the tape when the device is closed One laser diode is inserted into one plastic mounting clip and the clip is attached to the end of the standoff with a screw such that the laser diode points downward toward the surface to be measured Holes are drilled in the plastic card with the horizontally mounted reed switch such that the power and ground wires from the battery PCB and reed switch, respectively, may pass through them to the laser diode wires The power and ground wires from the laser diode on the standoff are zip tied to the standoff itself.

The power wire from the battery PCB mounted on the side of the measuring tape is soldered directly to the laser diode power wire The ground wire from the same PCB is soldered to one of the terminals of the horizontally mounted mechanical reed switch such that the connection between the terminals is broken when the switch is being pressed The opposite terminal is soldered to the ground wire leading to the laser diode mounted on the standoff The wires from the battery PCB on the tape measure body may be secured with a plastic clip with an adhesive backing Glue may be applied to solder points to provide strain relief The plastic rectangle with the vertically mounted reed switch is attached to the metal measuring tape tip with zip ties, with the reed switch facing the body of the tape measure The second battery PCB is mounted to the same plastic rectangle using standoffs with screws, with the battery clip facing away from the body of the tape measure A laser diode is placed in a plastic clip and the clip secured below the battery using a screw and nut. The laser diode points toward the surface being measured.

Wires from the laser diode, battery PCB, and reed switch are soldered in the same fashion as in the other laser/PCB/switch assembly described above Smaller rounded rectangles of plastic card are glued to the sides of the battery PCB mounted to the plastic rectangle with the vertically mounted reed switch.

Dabs of glue are placed on the ends of the reed switches and upon the surfaces which the reed switches touch in order close the gap between the switches and the surfaces such that when the tape measure is retracted as far as possible, the switches are activated and the circuits powering the lasers are broken.

This assembled device functions by automatically turning the lasers on when the tape measure is drawn out by pulling on the plastic tabs attached to the topmost PCB. The lasers project down onto the objects and surface to be measured, and the lasers turn off when the tape is retracted and the reed switches contact the body of the tape measure and the bottom of the topmost plastic rectangle, respectively.

Fourth Embodiment

In the fourth embodiment of the present invention, the components are: a tape measure; two laser card modules with corresponding mounting brackets; coin cell batteries with corresponding clips; two magnetic reed switches, each with miniature rare earth magnets; insulated copper wire; zip ties; miscellaneous hardware; small metal weights; and small pieces of wood. How the components function together is described in the following:

- Mounting holes are drilled in the plastic laser mounting brackets
- One mounting bracket is affixed to the left side of the tape measure flush with the front of the tape measure. The bracket's alignment may be adjusted both by turning the mounting screws and by injecting glue between the bracket and the tape measure body, acting as a shim material.
- An extra laser mounting bracket is cut off on the long end such that it may be turned opposite the bracket mounted to the side of the tape measure body and mounted to the right side of the tape measure
- A hole is drilled through the long side of the partial bracket such that one of the magnetic reed switches may be inserted into it at the edge, with the switch leads protruding out of the ends of the hole. This hole is drilled very close to the edge of the bracket so that a magnet outside of the bracket wall can activate the switch.
- The reed switch is rotated within the hole such that it can be activated by magnets placed in the plane of the bottom most bracket wall both behind the switch inside the bracket body and/or outside the bracket wall. The switch is then secured in place by injecting glue into the ends of the hole.
- An additional hole is drilled orthogonally to the hole for the switch. This hole is drilled in the center of the bracket wall such that it almost penetrates the cavity created by the first drilling.
- Into this new hole is mounted a small rare earth magnet to bias the switch closed unless another magnet is placed outside the bracket wall on the other side. Glue is injected into the hole to captivate the magnet.
- The bracket piece with biasing magnet and reed switch are mounted to the bottom of the tape measure using a small screw and glue.
- A battery clip is glued to the side of the partial bracket. The ground wire from the clip is soldered to the closest terminal pin of the reed switch.
- A laser card module is inserted into the mounting bracket on the left side of the tape measure. The laser's power wire is soldered to a wire attached across the bottom of the tape measure to the battery clip's positive terminal. The laser's ground wire is soldered to the other terminal of the reed switch such that when the reed switch circuit is completed, the ground connection to the laser is completed and it turns on.
- A mass of glue is built up below the tape measure port for another rare earth magnet to be mounted such that it will activate a second reed switch that will be mounted on the end of the tape.
- This second reed switch and biasing magnet are installed in a small rectangular piece of hobby wood approximately 1.5 inches in length and slightly narrower than the tape itself. This installation follows a procedure similar to that for the first reed switch and magnet above.
- An additional hole is drilled in the face of the wood block containing the reed switch, above and out of the way of the switch.
- Another small rare earth magnet is inserted into this hole and secured with glue such that when the wood block butts up against the tape measure port when the tape is retracted, the secondary magnets open the reed switches both in the partial bracket and in the wood block.
- The wood block is connected to the metal end of the measuring tape with zip ties through holes drilled in the wood block.
- A second complete laser mounting bracket is secured to the underside of the wooden block with screws.
- A second laser card module is inserted in the bracket
- A second battery clip is glued to the top of the measuring tape at the end
- The power wire from the laser card module is soldered to the nearest terminal of the reed switch
- The power wire from the battery clip is soldered to the other terminal of the reed switch
- The ground wire from the laser is soldered directly to the negative terminal of the battery clip
- Small metal weights are glued to the bottom and sides of the wooden block to balance out the weight of the laser and bracket mounted on the side of the block
- This assembled device functions by automatically turning the lasers on when the tape is extended and off when it is retracted by means of the magnets activating the reed switches. When the tape is extended and the lasers are activated, they project downward onto the objects and surface to be measured.

Fifth Embodiment

The following is the design information for the fifth embodiment, the device version which will serve as the baseline for a commercial production design. In the fifth embodiment, the components are: a tape measure; two laser card modules with a single corresponding mounting bracket; two or three batteries with corresponding wired clip, the batteries being either triple A or quadruple A; miscellaneous hardware; a metal bracket for a tape measure hub; insulated copper wire; a flat dual conductor ribbon, the ribbon being extremely low profile; zip ties; a seven segment LCD with 3 digits followed by a decimal point and an additional digit (for a total of 4 digits); two magnetic reed switches, each with miniature rare earth magnets; a programmable microcontroller on a mini PCB; a small linear voltage regulator, and plastic card material. How the components function together is described in the following:

- Tape measure housing is disassembled
- Part of the left side wall of the housing is cut away and removed, partially exposing the tape measure wheel hub
- Tape measure wheel is removed and unrolled. Low profile conductor strips (2) are attached to the tape on the bottom for the whole length of the tape. The tape may be shortened if necessary.
- Holes are drilled in the casing and wires run for the LCD display and power distribution
- Encoder magnets are attached to the left side of the tape wheel hub in a circle, spaced approximately every 1/10"
- The magnetic sensor is attached to the back side of the curved metal bracket
- The measuring tape and wheel are reinstalled in the case
- The bracket is attached to the case opening sides such that the hole in the middle of the bracket is centered over the wheel hub hole and the wheel screw is installed through the bracket through the tape wheel to the other side of the case The microcontroller PCB is mounted on the bracket The power distribution module or linear voltage regulator is installed to the left side of the casing using a mounting bracket The LCD control wires are soldered to the microcontroller PCB The LCD power wires are attached to the power distribution or linear regulator The microcontroller PCB power wires are connected to the power distribution module or linear regulator The magnetic sensor wires are soldered to the microcontroller PCB A laser card module is affixed to the left side of the tape measure body and the wires connected to the power distribution or linear regulator The plastic card material is used to make a box which the battery pack is installed in The plastic box is affixed to the left side of the tape measure, covering the exposed components A laser card module is affixed to the metal tape measure tip and the power wires soldered to the ends of the conductor strips in the tape This assembled device functions by utilizing a software program installed in the microcontroller to detect the rotation of the tape measure wheel, calculate the amount of tape extended, displaying that quantity to the LCD display in the selected unit scale, and turning on the laser card modules to project down onto the surface and objects to be measured. This version may also include magnetic reed switches similar to the fourth embodiment to turn the device on and off automatically and a switch or button to select between metric and imperial units.

Sixth Embodiment

The sixth embodiment is a static laser variant. In the sixth embodiment, the components are: a battery pack containing batteries to power the lasers, controlled by an on/off switch; a flat plastic pattern shape; multiple laser diodes, provided in sufficient numbers to place one laser approximately every inch around the perimeter of the pattern shape; insulated copper wire; a small dual-axis liquid level; a cylindrical handle which is either wooden or plastic; and two concentric flat copper circles, the copper circles serving as conductors for power and ground to the laser diodes. How the components function together is described in the following:

Batteries are inserted in battery pack

Handle is screwed to flat plastic pattern shape, which allows the device to be easily held over the measured surface Battery pack is glued to handle side of plastic template Flat copper concentric circles are glued to handle side of template One copper circle is soldered to battery pack ground lead, the other to the power lead Laser diodes are attached to template along perimeter of the shape, approximately 1 per linear inch Laser diodes' power and ground leads are soldered to the power and ground copper circles Dual-axis liquid level is glued to handle side of template Seventh Embodiment The seventh embodiment is a refined variant of the present invention. In the seventh embodiment, the components are: a tape measure with an embedded two-conductor flat wire; an integrated battery pack with batteries; an integrated power switch; and integrated laser diodes. How the components function together is described in the following:

Batteries are inserted into integrated battery pack to power lasers

Internal battery pack power and ground leads are connected to integrated conductors One laser diode is integrated into the bottom side of the tape measure body A second laser is integrated into the end of the measuring tape, and its power and ground leads are connected to the respective integrated conductors Power switch or button is pressed to activate lasers Tape measure may be moved in and out over the measuring surface with the lasers shining down to indicate length Although the invention has been explained in relation to its preferred embodiment, it is to be understood that many other possible modifications and variations can be made without departing from the spirit and scope of the invention as hereinafter claimed.

What is claimed is:

1. A non-contact visual measurement device comprises:
   a positional measuring device;
   a reference laser pointer;
   an at least one measurement laser pointer;
   said positional measuring device comprises a variable-length defining mechanism;
   said variable-length defining mechanism comprises a first end and a second end, wherein variable-length defining mechanism is used to measure a user-specified length;
   said first end and said second end being adjustably positioned opposite to each other along said user-specified length;
   said reference laser pointer being mounted onto said first end;
   an emission axis for said reference laser pointer being positioned perpendicular to said user-specified length;
   said measurement laser pointer being mounted onto said second end;
   an emission axis for said measurement laser pointer being positioned perpendicular to said user-specified length;
   said emission axis for said reference laser pointer and said emission axis for said measurement laser pointer being positioned parallel to each other; and
   said emission axis for said reference laser pointer and said emission axis for said measurement laser pointer being oriented in the same direction.

2. The non-contact visual measurement device as claimed in claim 1 comprises:
   an at least one dual-axis liquid level;
   said dual-axis liquid level being externally mounted onto said positional measuring device;
   a plane being defined by said emission axis for said reference laser pointer and said emission axis for said measurement laser pointer; and
   said dual-axis liquid level being positioned perpendicular to said plane.

3. The non-contact visual measurement device as claimed in claim 1 comprises:
   an at least one portable power source;
   said portable power source being housed within said positional measuring device; and
   said portable power source being electrically connected to said reference laser pointer and said measurement laser pointer.

4. The non-contact visual measurement device as claimed in claim 1 comprises:
a measurement display system;
said measurement display system comprises an at least one positional sensor, a microcontroller unit, and a visual display unit;
said positional sensor being operatively coupled between said first end and said second end;
said at least one positional sensor being electronically connected to said microcontroller unit; and
said microcontroller unit being electronically connected to said visual display unit.

5. The non-contact visual measurement device as claimed in claim 4 comprises:
said microcontroller unit being housed within said positional measuring device; and
said visual display unit being externally mounted to said positional measuring device.

6. The non-contact visual measurement device as claimed in claim 1 comprises:
an automatic laser activation system;
said automatic laser activation comprises an at least one positional sensor and a microcontroller unit;
said positional sensor being operatively coupled between said first end and said second end;
said at least one positional sensor being electronically connected to said microcontroller unit; and
said microcontroller being electronically connected to both said reference laser pointer and said measurement laser pointer.

7. The non-contact visual measurement device as claimed in claim 6 comprises:
said microcontroller unit being housed within said positional measuring device.

8. The non-contact visual measurement device as claimed in claim 1 comprises:
a pivot rod;
an alignment laser pointer;
said pivot rod being positioned perpendicular to said user-specified length;
said pivot rod being positioned parallel to said emission axis of said reference laser pointer and said emission axis of said measurement laser pointer;
said pivot rod being oriented in the same direction as said emission axis of said reference laser pointer and said emission axis of said measurement laser pointer;
said alignment laser pointer being perpendicularly mounted to said pivot rod; and
an emission axis of said alignment laser pointer intersecting both said emission axis of said reference laser pointer and said emission axis of said measurement laser pointer.

9. A non-contact visual measurement device comprises:
a positional measuring device;
a reference laser pointer;
an at least one measurement laser pointer;
an at least one dual-axis liquid level;
said positional measuring device comprises a variable-length defining mechanism;
said variable-length defining mechanism comprises a first end and a second end, wherein variable-length defining mechanism is used to measure a user-specified length;
said first end and said second end being adjustably positioned opposite to each other along said user-specified length;
said reference laser pointer being mounted onto said first end;
an emission axis for said reference laser pointer being positioned perpendicular to said user-specified length;
said measurement laser pointer being mounted onto said second end;
an emission axis for said measurement laser pointer being positioned perpendicular to said user-specified length;
said emission axis for said reference laser pointer and said emission axis for said measurement laser pointer being positioned parallel to each other;
said emission axis for said reference laser pointer and said emission axis for said measurement laser pointer being oriented in the same direction;
said dual-axis liquid level being externally mounted onto said positional measuring device;
a plane being defined by said emission axis for said reference laser pointer and said emission axis for said measurement laser pointer; and
said dual-axis liquid level being positioned perpendicular to said plane.

10. The non-contact visual measurement device as claimed in claim 9 comprises:
an at least one portable power source;
said portable power source being housed within said positional measuring device; and
said portable power source being electrically connected to said reference laser pointer and said measurement laser pointer.

11. The non-contact visual measurement device as claimed in claim 9 comprises:
a measurement display system;
said measurement display system comprises an at least one positional sensor, a microcontroller unit, and a visual display unit;
said positional sensor being operatively coupled between said first end and said second end;
said at least one positional sensor being electronically connected to said microcontroller unit;
said microcontroller unit being electronically connected to said visual display unit;
said microcontroller unit being housed within said positional measuring device; and
said visual display unit being externally mounted to said positional measuring device.

12. The non-contact visual measurement device as claimed in claim 9 comprises:
an automatic laser activation system;
said automatic laser activation comprises an at least one positional sensor and a microcontroller unit;
said positional sensor being operatively coupled between said first end and said second end;
said at least one positional sensor being electronically connected to said microcontroller unit;
said microcontroller being electronically connected to both said reference laser pointer and said measurement laser pointer; and
said microcontroller unit being housed within said positional measuring device.

13. The non-contact visual measurement device as claimed in claim 9 comprises:
a pivot rod;
an alignment laser pointer;
said pivot rod being positioned perpendicular to said user-specified length;
said pivot rod being positioned parallel to said emission axis of said reference laser pointer and said emission axis of said measurement laser pointer;

said pivot rod being oriented in the same direction as said emission axis of said reference laser pointer and said emission axis of said measurement laser pointer;

said alignment laser pointer being perpendicularly mounted to said pivot rod; and an emission axis of said alignment laser pointer intersecting both said emission axis of said reference laser pointer and said emission axis of said measurement laser pointer.

14. A non-contact visual measurement device comprises:
a positional measuring device;
a reference laser pointer;
an at least one measurement laser pointer;
an at least one dual-axis liquid level;
a pivot rod;
an alignment laser pointer;
said positional measuring device comprises a variable-length defining mechanism;
said variable-length defining mechanism comprises a first end and a second end, wherein variable-length defining mechanism is used to measure a user-specified length;
said first end and said second end being adjustably positioned opposite to each other along said user-specified length;
said reference laser pointer being mounted onto said first end;
an emission axis for said reference laser pointer being positioned perpendicular to said user-specified length;
said measurement laser pointer being mounted onto said second end;
an emission axis for said measurement laser pointer being positioned perpendicular to said user-specified length;
said emission axis for said reference laser pointer and said emission axis for said measurement laser pointer being positioned parallel to each other;
said emission axis for said reference laser pointer and said emission axis for said measurement laser pointer being oriented in the same direction;
said dual-axis liquid level being externally mounted onto said positional measuring device;
a plane being defined by said emission axis for said reference laser pointer and said emission axis for said measurement laser pointer;
said dual-axis liquid level being positioned perpendicular to said plane;
said pivot rod being positioned perpendicular to said user-specified length;
said pivot rod being positioned parallel to said emission axis of said reference laser pointer and said emission axis of said measurement laser pointer;
said pivot rod being oriented in the same direction as said emission axis of said reference laser pointer and said emission axis of said measurement laser pointer;
said alignment laser pointer being perpendicularly mounted to said pivot rod; and
an emission axis of said alignment laser pointer intersecting both said emission axis of said reference laser pointer and said emission axis of said measurement laser pointer.

15. The non-contact visual measurement device as claimed in claim 14 comprises:
an at least one portable power source;
said portable power source being housed within said positional measuring device; and
said portable power source being electrically connected to said reference laser pointer and said measurement laser pointer.

16. The non-contact visual measurement device as claimed in claim 14 comprises:
a measurement display system;
said measurement display system comprises an at least one positional sensor, a microcontroller unit, and a visual display unit;
said positional sensor being operatively coupled between said first end and said second end;
said at least one positional sensor being electronically connected to said microcontroller unit; and
said microcontroller unit being electronically connected to said visual display unit.

17. The non-contact visual measurement device as claimed in claim 16 comprises:
said microcontroller unit being housed within said positional measuring device; and
said visual display unit being externally mounted to said positional measuring device.

18. The non-contact visual measurement device as claimed in claim 14 comprises:
an automatic laser activation system;
said automatic laser activation comprises an at least one positional sensor and a microcontroller unit;
said positional sensor being operatively coupled between said first end and said second end;
said at least one positional sensor being electronically connected to said microcontroller unit; and
said microcontroller being electronically connected to both said reference laser pointer and said measurement laser pointer.

19. The non-contact visual measurement device as claimed in claim 18 comprises:
said microcontroller unit being housed within said positional measuring device.

* * * * *